United States Patent Office 3,138,539
Patented June 23, 1964

3,138,539
PREPARATION OF 5'-POLYPHOSPHATE
NUCLEOTIDES
Louis Laufer and Sidney Gutcho, both of Bronx, N.Y., assignors to Schwarz Bio Research, Inc., Mount Vernon, N.Y., a corporation of New York
No Drawing. Filed Oct. 5, 1961, Ser. No. 143,052
12 Claims. (Cl. 195—28)

This invention relates to new and useful improvements in the preparation of 5'-polyphosphate nucleotides. The invention more particularly relates to a novel process for the preparation of 5'-di- and triphosphate nucleotides.

Various nucleotides in the form of 5'-di-phosphates and 5'-triphosphates are present in animal and/or plant tissues. These include, for example, the di- and triphosphates of ribonucleosides, such as cytidine, uridine, guanosine, and adenosine; the di- and triphosphates of deoxyribonucleosides, such as deoxyadenosine.

The di- and triphosphates of ribonucleosides constitute substrates for the enzymatic production of ribonucleic acid, the compound present in all cells and associated with formation of protein. Similarly, the di- and triphosphates of the deoxyribonucleosides constitute substrates for the enzymatic production of deoxyribonucleic acid, a compound present in all cells and associated with the duplication of these cells and heredity. The 5'-di- and triphosphate nucleotides, therefore, constitute valuable materials useful in bioresearch and in basic research concerning living matter and its chemistry, and also constitute valuable materials for nutritional research purposes.

Attempts have been made to obtain these di- and triphosphates by the enzymatic phosphorylation of the corresponding nucleosides, i.e., the phosphate-free nucleic acid derivatives, utilizing enzymic material contained in yeast cells. This phosphorylation, however, has proven effective with adenosine only and will not serve to phosphorylate other nucleosides. Other processes for enzymatic phosphorylation to form di- and triphosphate nucleotides are known but have the disadvantage of requiring expensive adenosine 5'-triphosphate as a starting material and require the use of, at least, a partially purified enzyme material which is difficult to obtain and generally relatively expensive.

One object of this invention is a novel process for the production of 5'-di- and triphosphate nucleotides utilizing a relatively inexpensive and readily obtainable enzyme material and starting substrate.

This and still further objects will become apparent from the following description:

In accordance with the invention, we have discovered that 5'-monophosphate nucleotides may be readily converted into the corresponding 5'-di- and triphosphates by incubating the same in a medium containing plasmolyzed yeast, sugar, and phosphate ions.

The starting 5'-monophosphate nucleotides constitute known materials which may, for example, be obtained by the enzymatic digestion of nucleic acids such as RNA and DNA (ribonucleic acid and deoxyribonucleic acid) utilizing diesterase enzymes. Among the 5-nucleotides applicable as starting materials are the naturally occurring ribonucleotides such as for example but not limited to adenosine 5'-monophosphate (AMP); guanosine 5'-monophosphate (GMP); cytidine 5'-monophosphate (CMP); uridine 5'-monophosphate (UMP); and the deoxyribonucleotide deoxyadenosine 5'-monophosphate (DAMP). Other homologues of the deoxyribonucleotide series are essentially unreactive for reasons we do not understand. The yeast plasmolysate is preferably a plasmolysate of brewer's yeast (strain of S. cerevisiae) but may be a plasmolysate of other known yeasts, as for example baker's yeast, Torulopsis utilis, or any yeast or yeast-like organism characterized by a good phosphorylating system. A yeast plasmolysate, as the term is known and understood in the art, comprises a yeast product in which the walls of the yeast cells have been ruptured releasing the cellular material. This rupturing may, for example, be effected by mechanically milling the yeast.

The plasmolyzation is preferably effected by simply mixing the yeast cells with sugar as described in co-pending application Serial No. 139,065, filed September 19, 1961 and entitled, "Treatment of Yeast."

The sugar must ultimately be present in the form of glucose or fructose but may be added in a form which will convert to glucose or fructose in the incubation solution, as for example as sucrose.

The phosphate ion is added in the form of a soluble inorganic phosphate salt as for example $NaH_2PO_4$, $Na_2HPO_4$ and $Na_3PO_4$ brought to about pH 7.0 upon solution, phosphoric acid adjusted with NaOH, KOH, $NH_4OH$, potassium phosphates, or ammonium phosphates.

The aqueous incubation solution should contain the starting 5'-monophosphate nucleotide in amount of about 15 to 25 millimoles (mM) per liter (l.) and preferably 17 to 23 millimoles per liter, the yeast in amount of 140 to 215 g./l. and preferably 170 to 200 g./l., the sugar in amount of 12 to 18 g./l. and preferably 14 to 16 g./l. and the phosphate in an amount equivalent to 12 to 18 g./l. and preferably 14 to 16 g./l. based on monobasic monohydrate sodium phosphate. In addition 4% potassium chloride and 4% magnesium chloride solution in amount of 8–12 ml./l., preferably 9–10 ml./l.; 10% acetaldehyde, aqueous, in amount of 4–9 ml./l. and preferably 7–8 ml./l. and toluene in amount of 4–9 ml./l. and preferably 7–8 ml./l. are preferably used.

The incubation should be effected at a temperature between 20 degrees and 40 degrees C. and preferably 35 to 38 degrees C and a pH between 6.5 and 7.5 and preferably 6.8 and 7.2. The pH may be adjusted by the addition of sodium hydroxide solution, potassium hydroxide solution, and ammonium hydroxide.

The phosphorylation reaction generally takes between 0.5 and 2.5 hours. Completion of the phosphorylation may be noted by measuring, at fifteen-minute intervals, the amount of phosphorous bound to the mononucleotide, and taking as the end point that time when a given reading shows no significant increase over the last previous measurement.

After completion of the incubation, the yeast, solids may be removed from the incubation mixture by filtration, centrifugation, or the like, and the 5'-di- and/or triphosphate nucleotides may be recovered. The nucleotides thus may be precipitated from the clarified solution by conversion to the insoluble metal salts, as for example, barium salts, calcium salts, zinc salts by reaction with barium acetate or chloride, calcium acetate or chloride, or zinc acetate or chloride.

The insoluble salts after separation from the solution, as for example by filtration, settling, or the like, may then be decomposed by reaction with an acid and the nucleotides precipitated by the addition of alcohol, or the salts may be redissolved as for example in an acid or alkaline solution, and the solution of the nucleotide subjected to ion exchange chromatography.

The nucleotides may also be recovered from the clarified solution by selective adsorption, as for example upon activated carbon followed by elution and ion exchange chromatography.

Prior to the chromatography, in either case, a portion of the triphosphate may be hydrolyzed to the diphosphate as for example by heating in acid solution and the diphosphate present in the form of a sugar compound such as UDPG may be hydrolyzed to the diphosphate per se in a similar manner.

The following examples are given by way of illustration and not limitation:

Example 1

To phosphorylate AMP, 100 mg. of substrate and 356 mg. $NaH_2PO_4.H_2O$ are dissolved in 12–15 ml. water and the pH is adjusted to 6.9–7.0 with sodium hydroxide. Then, 0.2 ml. aliquots of 4% KCl and 4% $MgCl_2$ and 0.1 ml. of 10% acetaldehyde are added followed by the addition of the sugar and yeast enzyme, i.e., a plasmolysate formed by mixing 3.56 g. brewer's yeast and 300 mg. glucose.

Thereupon, the volume is adjusted to 20 ml. and the pH to 6.8–6.9. Incubation of this suspension at 37 degrees for a period of one hour showed by chemical assay that 82% of the AMP had been converted to a mixture of the adenosine di- and triphosphates (ADP and ATP).

Isolation of the products was achieved by steps which include:

(1) Filtration to remove the yeast solids,
(2) Precipitation of phosphates as barium salts by the addition of barium,
(3) Decomposition of the recovered Ba salts with a slight excess of surfuric acid,
(4) Filtration of the $BaSO_4$,
(5) Precipitation of the adenosine phosphates from filtrate by addition to 5–10 volumes of alcohol for each volume of filtrate,
(6) Ion exchange chromatography of an aqueous solution of these adenosine phosphates.

A similar experiment in which part of the orthophosphate was replaced by a molar equivalent of pyrophosphate (277 mg. $NaH_2PO_4.H_2O$ and 130 mg.

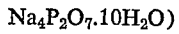

$$Na_4P_2O_7.10H_2O)$$

gave a similar degree of phosphorylation after one hour of incubation.

Example 2

The phosphorylation of GMP can be carried out in a system containing 17.0 grams sodium salt of GMP, 29.4 grams $NaH_2PO_4.H_2O$, 30.0 grams glucose, 356 grams brewer's yeast, 20 ml. 4% KCl and 4% $MgCl_2$, 13 ml. 10% acetaldehyde, 10 ml. toluene in a total volume of 2 liters at pH 7.0. (The sugar and toluene are used to plasmolyze the yeast cells.) Incubation for one hour, 25 minutes at 37 degrees C. with stirring gave maximal uptake of inorganic phosphorous by the GMP, and at least 80% phosphorylation of GMP to GDP and GTP. Isolation of the products can be achieved by steps which include (1) Filtration to remove yeast solids,
(2) Precipitation of phosphates as zinc salts at a pH of 9.5,
(3) Recovery of these zinc salts by filtration and thorough washing with water,
(4) Solution of the zinc salts at pH 1.0 by addition of concentrated hydrochloric acid,
(5) Precipitation of the zinc guanosine phosphates by addition of the acidic aqueous solution to 5 volumes of alcohol and recovery of these salts by filtration and washing with alcohol,
(6) Suspension of the solids in water to give about a 2% solution of GTP (the predominant nucleotide present), adjusting to pH 4.0 with $NH_4OH$, and heating this suspension, with stirring, at a suspension temperature of more than 80 degrees C. for a half hour to hydrolyze part of the GTP to GDP,
(7) Dilution to at least 10 liters with water with adjustment of the pH to 10.0 with $NH_4OH$ to give a solution of the zinc salts,
(8) Ion exchange chromatography of the clarified solution of these zinc guanosine phosphates.

In the above example, 88.5% of the optical density at 260 m$\mu$ of the yeast filtrate was recovered in the solution of the zinc salts at pH 1.0. Alcoholic precipitation of the zinc salts gave 77.7% of the initial $OD_{260}$ in the zinc cake since only 10.8% of this $OD_{260}$ was found in the alcoholic mother liquor which should contain the bulk of the other zinc salts (zinc phosphate and zinc hexose phosphates). Assay of the zinc cake showed that the dried solids calculated as ZnGTP were 75% pure. The final solution of the zinc salts prior to ion exchange chromatography showed 73.3% of the $OD_{260}$ of the yeast filtrate. Elution of the nucleotides from the resin showed 17.5% of the influent as GMP, 44.7% as GDP, and 28.8% as GTP while the remainder was accounted for as breakthrough and $OD_{260}$ recoverable from the resin only with strong acid.

Therefore, 54% of the initial $OD_{260}$ can be recovered from the resin as pure fractions of GDP and GTP. The proportions of these products can be varied by the degree of hydrolysis at pH 4.0.

Example 3

The phosphorylation of UMP can be carried out in a system containing 17.7 grams of a sodium salt of UMP, 30.4 grams of $NaH_2PO_4.H_2O$, 30.0 grams of glucose, 356 grams of yeast, 20 ml. of 4% KCl, 20 ml. of 4% $MgCl_2$, 15 ml. of 10% acetaldehyde, and 10 ml. of toluene in a volume of 2 liters at pH 7.0. Incubation for 2 hours at 37 degrees with stirring, generally gives complete phosphorylation of UMP. At this time, 20.9 grams of $Na_4P_2O_7.10H_2O$ and if desired 23.5 grams of $KF.2H_2O$ may be added, and after 15 minutes of additional incubation, the enzymatic reaction is stopped by acidification.

The effect of the pyrophosphate is to convert UDPG (uridine diphosphoglucose) to UTP, but this step can be omitted if desired. Isolation of the products can be achieved in steps which include:

(1) Filtration to remove yeast solids,
(2) Adsorption of the compounds possessing ultraviolet absorption at 260 m$\mu$ upon activated carbon,
(3) Elution of the nucleotides from the washed carbon with 50% isopropyl alcohol containing 1% toluene and 1% $NH_4OH$ (v./v.),
(4) concentration of the eluate to remove alcohol,
(5) Dilution of the concentrate to about a 5% solution of nucleotide, and acidification to pH 2.0, and heating at a solution temperature of over 90 degrees C. for 15 minutes to effect the complete hydrolysis of residual UDPG to UDP and the partial hydrolysis of UTP to UDP,
(6) Further dilution to about 1 liter at pH 9.0 for ion exchange chromatography of the uridine phosphates.

76.6% of the optical density at 260 m$\mu$ determined for the yeast filtrate was recovered essentially as an alcoholic solution of nucleotides by adsorption and elution from activated carbon. The $OD_{260}$ calculated as UMP was 13.1 grams whereas 13.0 grams of UMP were taken (17.7 g. sodium salt, 74% UMP). The remaining $OD_{260}$ was unadsorbed on the carbon (6.5%) or bound to the carbon (16.9%). Concentration to remove alcohol and dilution for ion exchange chromatography gave an aqueous solution with 75.4% of the yeast filtrate $OD_{260}$. No hydrolysis at pH 2.0 was carried out. Elution of the nucleotides from the ion exchange resin gave 11.5% of the influent $OD_{260}$ as UMP, 27.9% as UDP containing a small amount of UDPG, and 55.6% as UTP. Therefore, 63% of the initial $OD_{260}$ was recovered from the resin as solutions of UDP and UDPG, and UTP. Purification of the UDP was effected by acid hydrolysis and rechromatography. Isolation of the UDP and UTP is via the carbon adsorption technique. As a variation of this procedure, the pyrophosphate can be omitted in the enzymatic reaction, and the UDPG hydrolyzed to UDP in solutions at pH 2.0 either following step 1 or at step 5 above. Also, the example can be carried out without pyrophosphate and without hydrolysis and the UDPG separated from the other nucleotides by an appropriate technique of ion exchange chromatography.

*Example 4*

The phosphorylation of UMP can be carried out in a system containing 0.885 gram of a sodium salt of UMP, 1.52 grams of $NaH_2PO_4 \cdot H_2O$, 150 grams of glucose, 17.8 grams of brewer's yeast, 1.0 ml. of 4% KCl, 1.0 ml. of 4% $MgCl_2$, 0.75 ml. of 10% acetaldehyde, and 0.75 ml. of toluene in a volume of 100 ml. at pH 7.0. After incubation for 1 hour and 50 minutes at 37 degrees C. with stirring, chemical assay of the yeast filtrate showed 65% of the UMP converted to UDP and UTP.

*Example 5*

The phosphorylation of DAMP can be carried out in a system containing 100 mg. or 122 mg. of a sodium salt of DAMP, 356 mg. of $NaH_2PO_4H_2O$, 300 mg. of glucose, 3.56 grams of brewer's yeast, 0.2 ml. of 4% KCl, 0.2 ml. of 4% $MgCl_2$, 0.1 ml. of 10% acetaldehyde, and 0.1 ml. of toluene in a volume of 20 ml. at pH 6.9–7.0.

Incubation at 37 degrees C. for nearly 2 hours gave about 80% conversion of DAMP to DADP and DATP by chemical analysis. Isolation of these compounds from the yeast filtrate can be carried out by known chemical techniques.

*Example 6*

Example 1 may be repeated utilizing GMP, UMP, CMP, and DAMP respectively as the substrate. Similarly, in place of the $NaH_2PO_4 \cdot H_2O$, the following phosphates may be used: potassium phosphate, ammonium phosphate, sodium pyrophosphate, or soluble phosphate including dibasic and tribasic phosphates, phosphoric acid adjusted to pH about 7.0 with KOH, NaOH or $NH_4OH$ and in place of glucose, the following sugars may be used: fructose, sucrose, mannose, maltose.

While the invention has been described in detail with reference to certain specific embodiments, various changes and modifications which fall within the spirit of the invention and scope of the appended claims will become apparent to the skilled artisan. The invention is, therefore, only intended to be limited by the appended claims or their equivalents wherein we have endeavored to claim all inherent novelty.

We claim:
1. A process for the production of 5'-polyphosphate nucleotides of the type consisting of 5'-diphosphate nucleotides, 5'-triphosphate nucleotides and mixtures thereof, which comprises:
   incubating a 5'-monophosphate nucleotide selected from the group consisting of adenosine 5'-monophosphate, guanosine 5'-monophosphate cytidine 5'-monophosphate, uridine 5'-monophosphate and deoxyadenosine 5' - monophosphate in an incubation solution containing yeast plasmolysate, sugar selected from the group consisting of glucose, fructose, sugars which will convert to glucose in said incubation solution and sugars which will convert to fructose in said incubation solution, and phosphate ions, said incubation being carried out at a pH of between about 6.5 and 7.5 and at a temperature of between about 20° C. and 40° C. and said incubation being carried out for a period of time sufficient to effect phosphorylation of said 5'-monophosphate nucleotides to form said 5'-polyphosphate nucleotides; and
   recovering the phosphorylated 5'-polyphosphate nucleotides formed during said incubation from the incubation solution.

2. The process for the production of 5'-polyphosphate nucleotides as claimed in claim 1 wherein the incubation solution contains: about 15 to 25 millimoles of 5'-monophosphate nucleotide per liter of solution; about 140 to 215 grams of yeast plasmolysate per liter of solution; and about 12 to 18 grams of sugar per liter of solution.

3. The process for the production of 5'-polyphosphate nucleotides as claimed in claim 1 wherein the incubation solution contains: 17 to 23 millimoles of 5'-monophosphate nucleotide per liter of solution; 170 to 200 grams of yeast plasmolysate per liter of solution; and 14 to 16 grams of sugar per liter of solution.

4. The process for the production of 5'-polyphosphate nucleotides as claimed in claim 1 wherein the phosphate ions are in the form of a phosphate compound selected from the group consisting of sodium phosphates, potassium phosphates, ammonium phosphates, phosphoric acid and mixtures thereof, said phosphate compound being present in the incubation solution in an amount of about 12 to 18 grams per liter of solution.

5. The process for the production of 5'-polyphosphate nucleotides as claimed in claim 1 wherein the phosphate ions are in the form of a phosphate compound selected from the group consisting of sodium phosphates, potassium phosphates, ammonium phosphates, phosphoric acid and mixtures thereof, said phosphate compound being present in the incubation solution in an amount of 14 to 16 grams per liter of solution.

6. The process for the production of 5'-polyphosphate nucleotides as claimed in claim 1 wherein said incubation is carried out at a pH of between 6.8 and 7.2 and at a temperature of between 35° C. and 38° C.

7. The process for the production of 5'-polyphosphate nucleotides as claimed in claim 1 wherein said incubation is carried out for a period of time between 0.5 hour and 2.5 hours.

8. The process for the production of 5'-polyphosphate nucleotides as claimed in claim 1 wherein the incubation solution contains potassium chloride and magnesium chloride.

9. The process for the production of 5'-polyphosphate nucleotides as claimed in claim 7 wherein the incubation solution additionally contains acetaldehyde.

10. The process for the production of 5'-polyphosphate nucleotides as claimed in claim 8 wherein the incubation solution additionally contains toluene.

11. The process for the production of 5'-polyphosphate nucleotides as claimed in claim 1 wherein the incubation solution contains: 4% potassium chloride and 4% magnesium chloride solution in an amount of between about 8 to 12 milliliters of said solution per liter of incubation solution; 10% acetaldehyde aqueous solution in an amount of between about 4 and 9 milliliters of said aqueous solution per liter of incubation solution; and toluene in an amount of between about 4 to 9 milliliters of toluene per liter of incubation solution.

12. The process for the production of 5'-polyphosphate nucleotides as claimed in claim 1 wherein the incubation solution contains: 4% potassium chloride and 4% magnesium chloride solution in an amount of 9 to 10 milliliters of said solution per liter of incubation solution; 10% acetaldehyde aqueous solution in an amount of 7 to 8 milliliters of said aqueous solution per liter of incubation solution; and toluene in an amount of 7 to 8 milliliters of toluene per liter of incubation solution.

References Cited in the file of this patent

Cook: "The Chemistry and Biology of Yeasts," published by Academic Press Inc., New York (1958), pp. 493 to 501.

Colowick et al.: "Methods in Enzymology," vol. III, published by Academic Press Inc., New York (1957), pp. 787 to 791.